US008309832B2

(12) United States Patent
Sattlecker et al.

(10) Patent No.: US 8,309,832 B2
(45) Date of Patent: Nov. 13, 2012

(54) DEVICE FOR DISPLAYING MUSICAL RELATIONSHIPS

(76) Inventors: Anton Sattlecker, Mattighofen (AT); Bruno Sattlecker, Anthering (AT)

( * ) Notice: Subject to any disclaimer, the term of this patent is extended or adjusted under 35 U.S.C. 154(b) by 36 days.

(21) Appl. No.: 12/737,532

(22) PCT Filed: Jul. 15, 2009

(86) PCT No.: PCT/EP2009/059058
§ 371 (c)(1),
(2), (4) Date: Feb. 17, 2011

(87) PCT Pub. No.: WO2010/010020
PCT Pub. Date: Jan. 28, 2010

(65) Prior Publication Data

US 2011/0232463 A1 Sep. 29, 2011

(30) Foreign Application Priority Data

Jul. 24, 2008 (AU) .............................. A 1151/2008

(51) Int. Cl.
*G09B 15/00* (2006.01)
(52) U.S. Cl. ........................................................ 84/483.1
(58) Field of Classification Search .................. 84/483.1
See application file for complete search history.

(56) References Cited

U.S. PATENT DOCUMENTS 3,677,130 A 7/1972 Petreycik
5,524,522 A 6/1996 Hesnan
7,485,793 B1 * 2/2009 Divine ........................ 84/470 R

FOREIGN PATENT DOCUMENTS

DE 909409 3/1954
DE 2901785 7/1980
DE 4002361 8/1991
GB 717683 11/1954

OTHER PUBLICATIONS

English Abstract of DE4002361.

* cited by examiner

*Primary Examiner* — Jianchun Qin
(74) *Attorney, Agent, or Firm* — Dykema Gossett PLLC

(57) ABSTRACT

A device (1) for displaying musical relationships includes a display element (2) which is displaceable in a first direction in a holder (3) and is additionally displaceable via the holder (3) along a base element (4) in a second direction running perpendicularly to the first direction, scales (20, 21, 22), chords (24, 25), and their inverses (28) being displayed on the base element (4). The display element (2) has at least one transparent display field (12) and at least one associated chord (24, 25) with the associated inverses (28) being readable in the display field (12) for each tone of a scale. The device is a teaching aid for making the theory of harmony in music understandable Further, elements (40, 50, 60, 70) of the theory of harmony can be placed on the back side of the base element (4).

10 Claims, 7 Drawing Sheets

Fig. 2
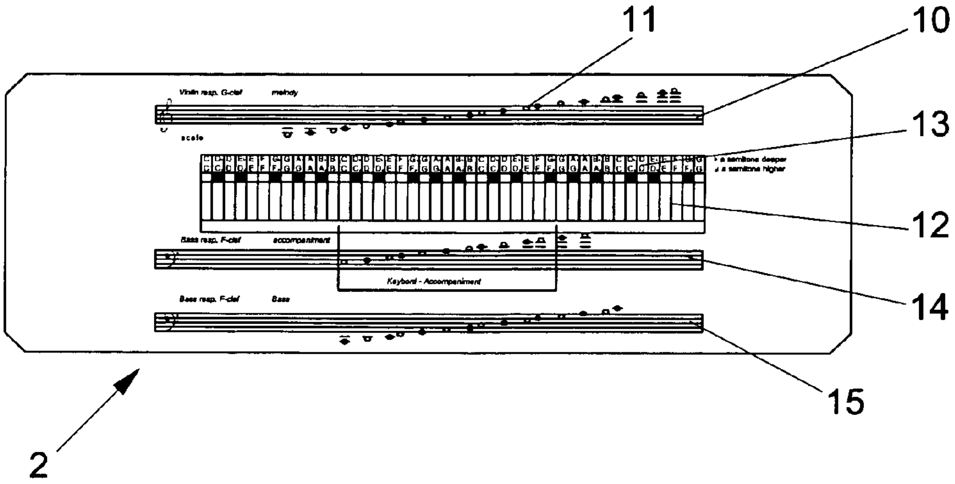
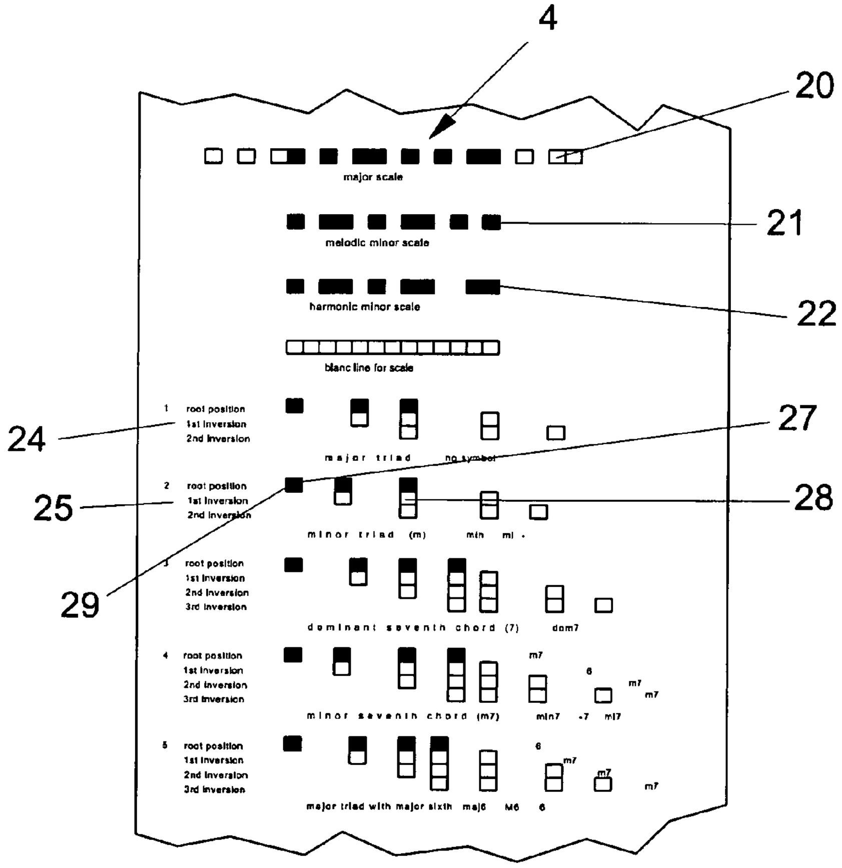
Fig. 3a

Fig. 3e
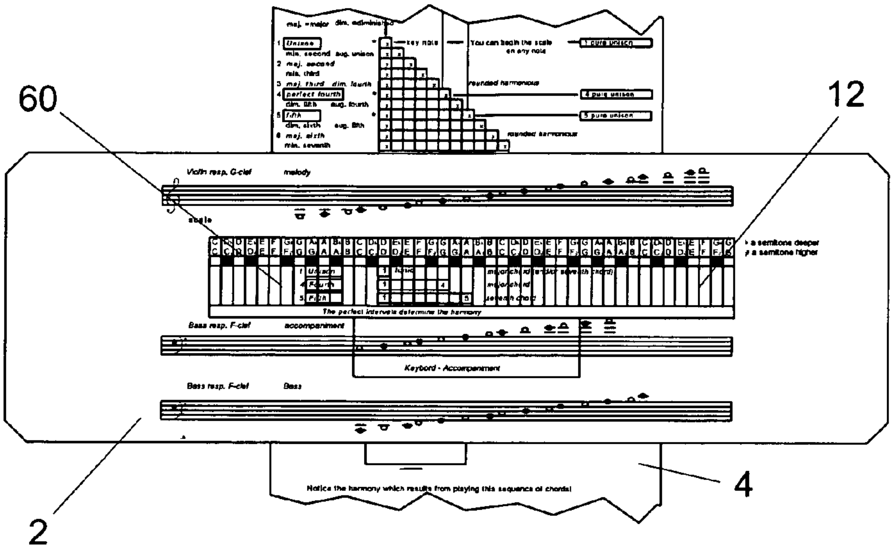
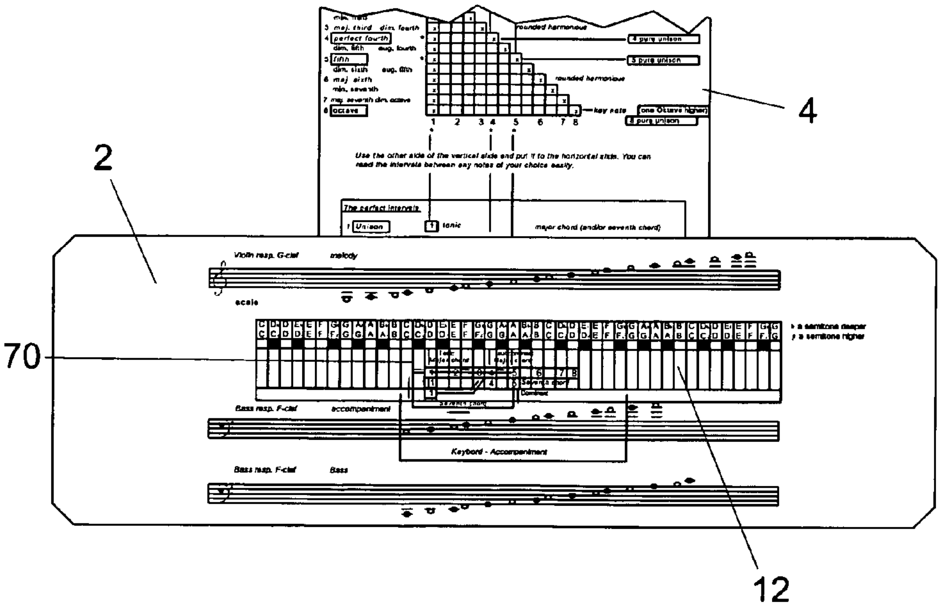
Fig. 3f

DEVICE FOR DISPLAYING MUSICAL RELATIONSHIPS

BACKGROUND OF THE INVENTION

1. Field of the Invention

The invention relates to a device for displaying musical relationships, a display element being provided, which has at least one transparent display field, and being situated in a holder so it is displaceable in a first direction, and is additionally displaceable via the holder along a base element in a second direction, which runs perpendicular to the first direction, musical scales, chords, and their inverses being displayed on the base element, and at least one associated chord having the associated inverses being readable in the display field for each tone of a musical scale, as well as the use thereof.

2. The Prior Art

A piece of music is typically shown by notes in staves. In this case, the melody, the accompaniment, and the bass notes are assembled into scores in the respective musical notation. These scores are confusing and often difficult to understand, in particular for persons who are at the beginning of their musical education. Furthermore, still further chord specifications in the form of letter-number relationships such as "$D^7$" or "Cm" are displayed on the scores.

Devices are known in the prior art which have been developed for finding suitable chords or displaying them. Thus, for example, DE 40 02 361 A1 describes a music aid for setting the key, scale, and corresponding harmonic relationships, the key being set to a selectable root using a setting device, the corresponding tone sequence being visually and/or acoustically displayed and the associated chord triads additionally being automatically displayed. In this case, the appliance comprises a display bar having note identifications, on which a displaceably situated sliding part having window breakouts displays the respective chords.

However, this appliance is not suitable for the purpose of making the harmonic relationships and their implementation in connection with a musical instrument, in particular with a keyboard instrument, accessible to a novice.

A device of the type mentioned at the beginning is disclosed in GB 717 683 A. In the case of the device described in this document, the notes to be played for a selected chord are specified in the form of numbers, the respective number having to be set on an additional rotatable element to be able to read the note names. This adjustment wheel must therefore be pivoted appropriately in each case for the respective notes; furthermore, the construction and the significance of the musical notation is not made accessible to the user.

It is therefore the object of the invention to provide a device for displaying harmonic relationships, which displays notes, scales, chords, intervals, and harmonies in a comprehensible way and at a glance for a user without any prior knowledge.

SUMMARY OF THE INVENTION

This object is achieved according to the invention by a device of the type cited at the beginning in that at least one staff is additionally shown on the display element, whose notes correspond to a keyboard display, which is also situated on the display element. A display element or horizontal slide is thus provided according to the invention, which is situated so it is displaceable in a first direction in a holder and is additionally displaceable via the holder along a base element or vertical slide in a second direction running perpendicular to the first direction, musical scales, chords, and their inverses being shown on the base element, the display element having at least one transparent display field, and at least one associated chord having the associated inverses being readable in the display field for each tone of a scale. An assignment of each note to the corresponding key of a keyboard instrument is also clearly obvious at the same time.

The first movement of the display element is referred to as "horizontal" hereafter and the second movement running along the base element as "vertical", because this corresponds to the usage position predefined by the inscription of the device.

In the device according to the invention, all chords which are assignable to a tone of a scale are shown adjacent to one another. The user of this device thus receives complete information of all possible chords for each tone of a specific scale. The associated inverses are shown in addition to each chord.

For better understanding of the musical relationships, the staff is shown as the melody staff in the key of G on the display element, for example. It is also advantageous if the accompaniment staff in the key of F and the bass staff, also in the key of F, are also shown on the display element. The user of the device thus receives a complete overview of the musical relationships and the associated chords.

This overview is advantageously completed in that major scales, natural minor scales, and/or harmonic minor scales are additionally displayed on the base element.

In a preferred embodiment of the invention, the chords shown on the base element are seventeen triads and four-note chords in the main display. In addition, the inverses associated with each of the individual chords are displayed.

In a further embodiment of the invention, an additional field is provided on the base element, in which chords developed by the user can be entered.

In a further preferred embodiment of the invention, further elements for imparting the theory of harmony and overview in music are displayed on the back side of the base element, the base element being insertable on both sides into the holder, so that either the front side or the back side of the base element is visible on the display field. It can also be provided that the display element has two transparent display fields, so that both sides of the base element are visible, and turning over the base element in the display element is dispensed with. The elements displayed on the back side of the base element are preferably a representation of the major scales with numbers and special marks, around which an interval table constructed as a half pyramid, three natural intervals which determine harmony, and a so-called "harmony cycle", in which intervals are shown in the cycle.

The device according to the invention is particularly suitable for use as a teaching aid for making the theory of harmony in music understandable. In particular, the relationships and the position of the individual notes in the staves are made understandable. In this case, the display element is vertically displaced along the base element, until the upper edge of the display element has reached the desired chord identification, the notation of the desired chord, optionally having its associated inverses, being horizontally readable in the display field. The transparency of all representations of notes, scales, many typical chords, and their inverses is the foundation for the ability to learn and the understanding of musical rules and relationships. The user recognizes that a note or a chord in the melody line is not identical in the way it is written to a note or a chord in the accompaniment line, which is notated in the key of F in contrast to the melody line, although it is the same note or the same chord. The device illustrates the tones which a chord comprises, what a chord is composed of, and how the system of chords functions. The user of the invention therefore also learns to develop chords independently.

BRIEF DESCRIPTION OF THE DRAWINGS

The invention is explained in greater detail hereafter on the basis of a nonrestrictive exemplary embodiment with associated figures. In the figures:

FIG. 2 shows the display element of the device according to FIG. 1,

FIG. 3*a* shows a detail view of the front view of the base element from FIG. 3, FIGS. 3*c* to 3*f* show detail views of the back side of the base element in connection with the display element.

DETAILED DESCRIPTION OF THE PREFERRED EMBODIMENT

Figure 1:
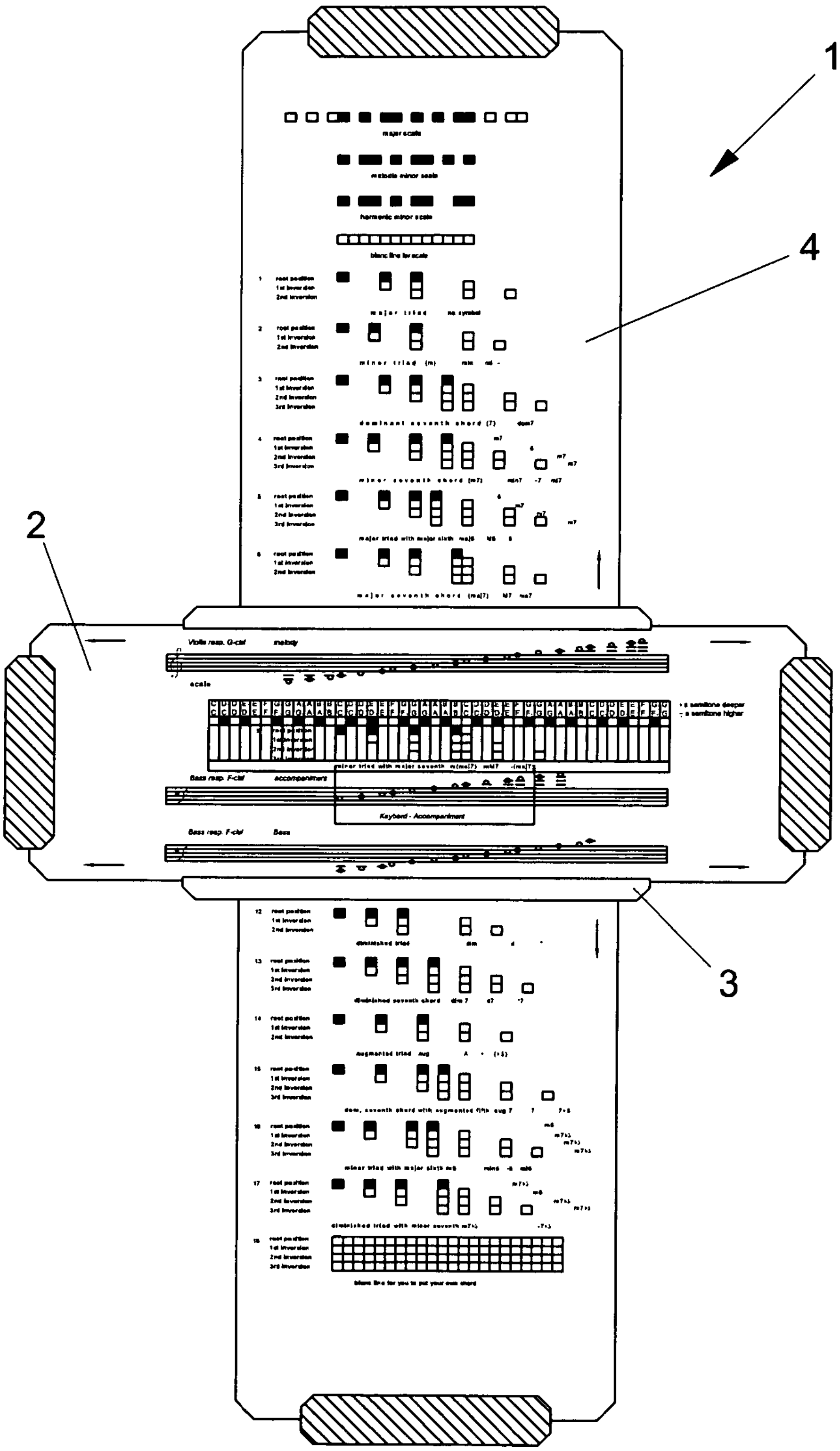
FIG. 1 shows the device according to the invention.

The device 1 according to the invention for displaying harmonic relationships in music is shown in FIG. 1. It comprises a display element 2, which is situated so it is horizontally displaceable in a holder 3 in the usage position, and a base element 4, the display element 2 being vertically displaceable on the base element 4 with the aid of the holder 3.

The melody staff 10, which is shown in the violin key or key of G, is located on the display element 2 (FIG. 2). The notes 11 shown therein have a direct relationship to a piano keyboard located underneath, which is implemented as transparent as the display field 12. The respective identifications 13 of the respective notes 11 (in halftone steps) are located in the melody staff 10 above the display field 12. The identifications 13 are—as is internationally typical—implemented as # and b. The respective musical notation in the melody staff 10 in the respective octave can be found using the note names 13 and vice versa. The note intervals are shown in the form of a raster in the identification line 13, to make it easier to find and calculate the respective notes.

Furthermore, the accompaniment staff 14 and the bass staff 15 are shown on the display element 2, which are each notated in the base key or key of F. If the chord identification or the musical notation is known to the user of the device according to the invention, the respective other identification can be found easily. The notes are shown one octave lower in the base staff 15 than in the accompaniment staff 14.

Reference is made in the accompaniment staff 14 to the keyboard accompaniment. The chords and the inverses are typically to be played in the range of only nineteen halftones. This range is bordered on the accompaniment staff 14 and therefore particularly emphasized.

Figure 3:
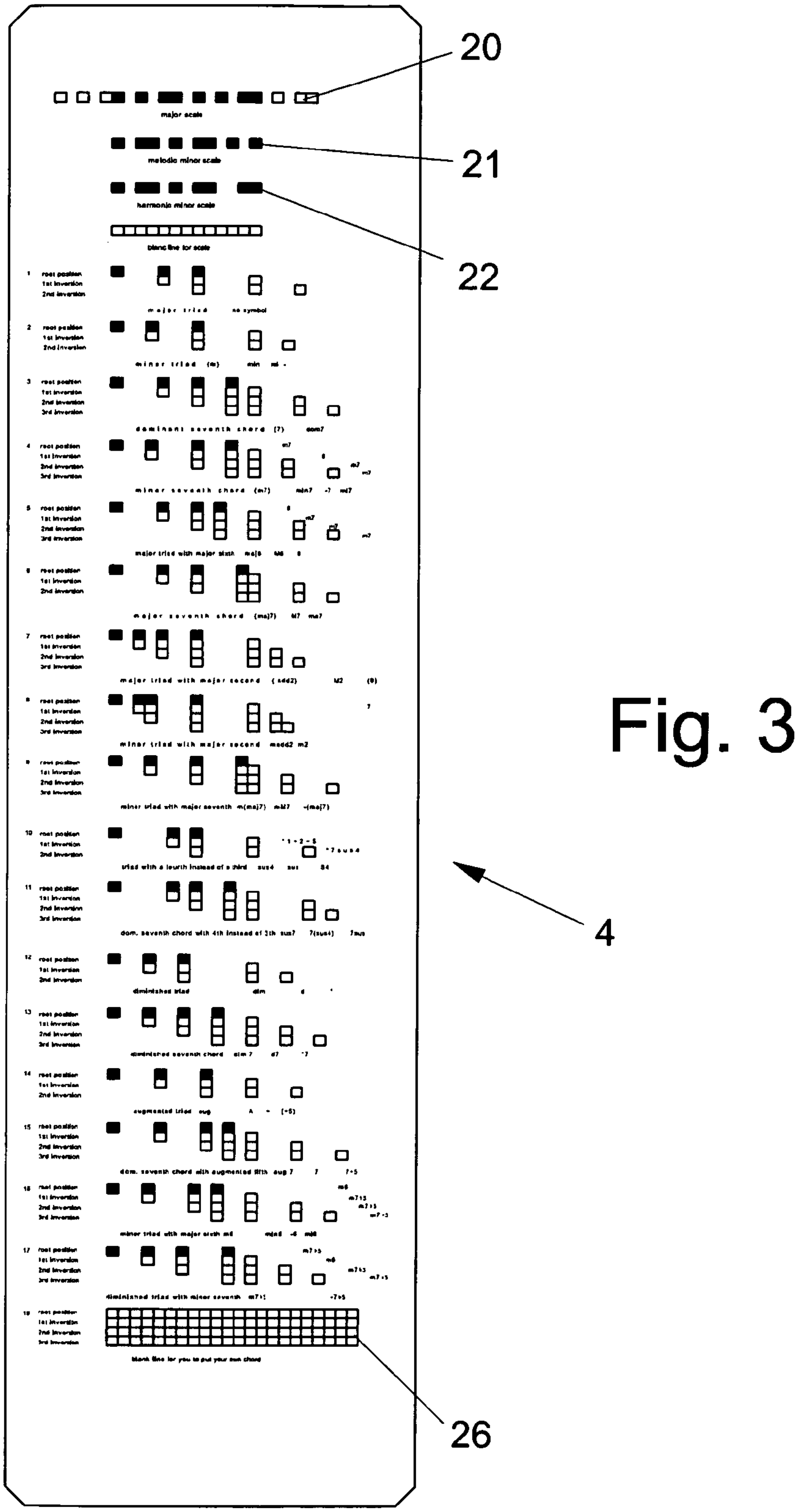
FIG. 3 shows the front side of the base element of the device from FIG. 1.

As shown in FIG. 3, and in particular in FIG. 3*a*, a representation of the major scale 20, the natural minor scale 21, and the harmonic minor scale 22 is shown in the upper area of the base element 4. The major scale 20 is shown having its intervals whole tone, whole tone, halftone, whole tone, whole tone, whole tone, and halftone. In the natural minor scale 21, the interval sequence is whole tone, halftone, whole tone, whole tone, halftone, whole tone, whole tone and in the harmonic minor scale 22, it is whole tone, halftone, whole tone, whole tone, halftone, one and one-half tone, halftone. Since the display element 2 is horizontally displaceable, every fundamental tone with which the respective scale is to begin can be set, so that a total of 12 scales are settable.

Below the scales shown, images of various chords are located, such as the major triad 24 having two inverses. The respective notes 11 belonging to the chord are to be read horizontally in this case either on the note identification 13 or, for example, directly in the melody staff 10. A total of 17 chords and their inverses are shown: major triad (2 inverses), minor triad (3 inverses), dominant seventh chord (3 inverses), minor seventh chord (3 inverses), major triad with major sixth (3 inverses), major seventh chord (3 inverses), major triad with major second (3 inverses), minor triad with major second (3 inverses), minor triad with major seventh (3 inverses), triad with fourth instead of third (2 inverses), dominant seventh chord with fourth instead of third (4 inverses), diminished triad (2 inverses), diminished seventh chord (3 inverses), augmented triad (2 inverses), dominant seventh chord with augmented fifth (3 inverses), minor triad with major sixth (3 inverses), and diminished triad with minor seventh (3 inverses).

The respective basic chords are each to be found in the first line of the chord groups and are shown in a darker color than their inverses.

A still empty chord field 26 having corresponding raster for entering self-developed chords is located at the lower end of the base element 4.

Figure 3B:
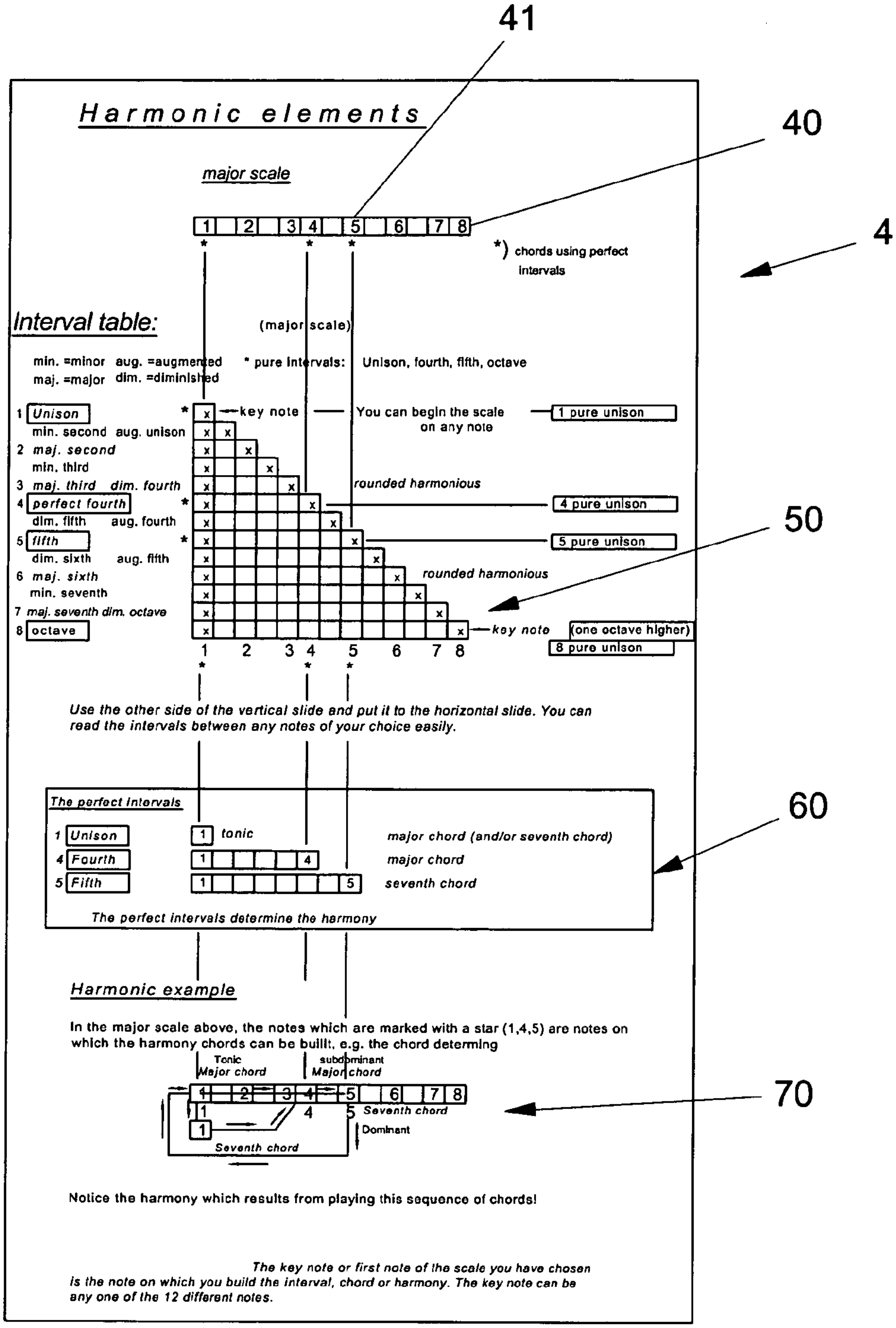
FIG. 3*b* shows the back side of the base element.
Figure 3C:
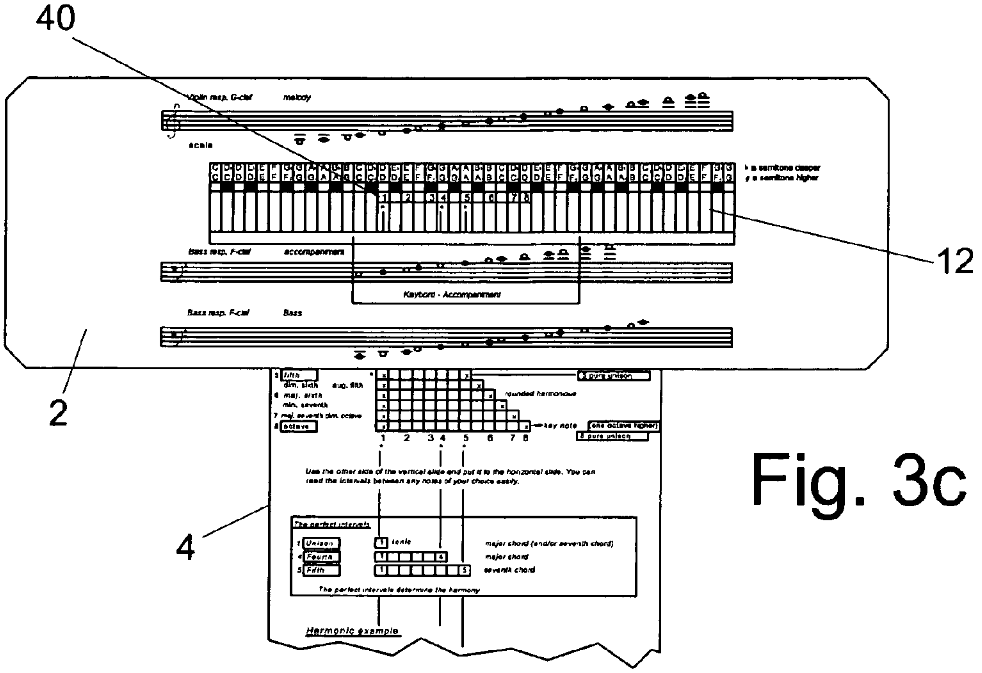

The back side of the vertical slide 4 is shown in FIG. 3*b*, which is insertable into the holder 3 in such a manner that the elements located thereon are displayed in the display field 12 (see FIG. 3*c*). A major scale 40 in the form of a line is shown on the vertical slide 4, the individual tones 41 being identified by numbers. The tones 41 identified by "*" identify those tones 41 which form natural intervals.

Figure 3D:
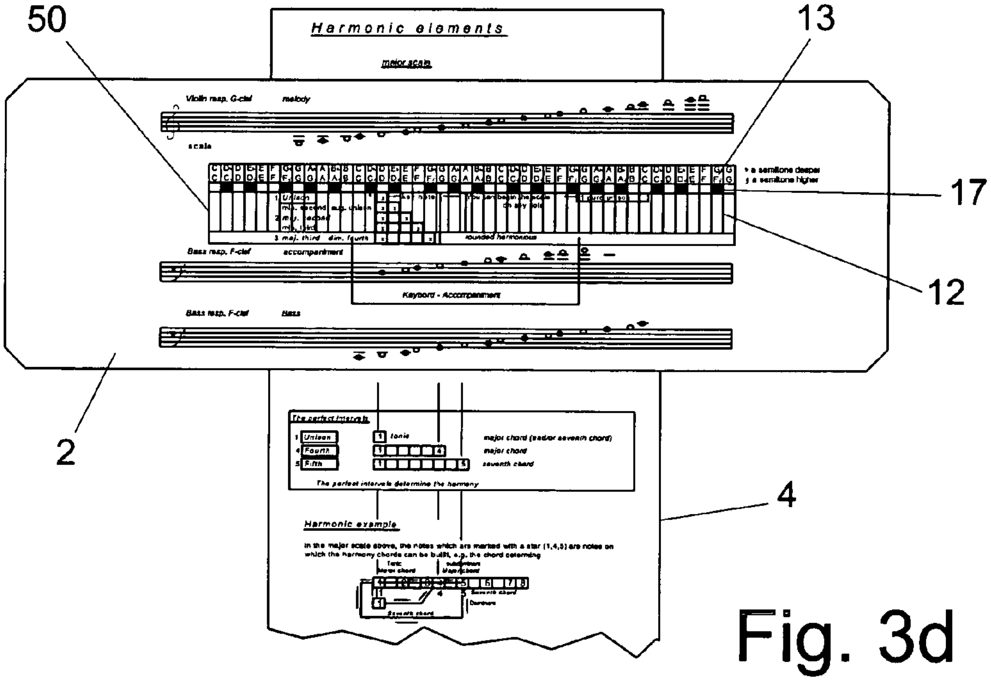

An interval table 50 constructed in the form of a half pyramid is shown adjoining thereon, with the aid of which the musician can read and easily recognize the musical relationships for each tone 41. In the intervals, a differentiation is made between minor and major intervals, in addition natural intervals, as well as intervals which are each diminished or augmented by a halftone. These intervals or harmony elements from prime to octave are also readable in the display window 12 according to FIG. 3*d* upon appropriate displacement of the vertical slide 4, the tones identified by "x", which form the respective interval, being readable in the notation 13, while simultaneously the keys 17 to be played on a keyboard instrument, such as keyboard or piano, are also identified by "x". By displacing the horizontal slide 2, the interval can be constructed starting from any arbitrary tone.

In addition, the natural intervals 60 having chord notations can also be displayed for illustration in the display field 12 (FIG. 3*e*).

Furthermore, a harmony plan 70 having the chord sequences (tonic, subdominant, and dominant) is shown on the horizontal slide 4 (FIG. 3*f*), the tonic (the chord beginning cadence) being able to be formed from any desired tone in this case.

Figure 4:
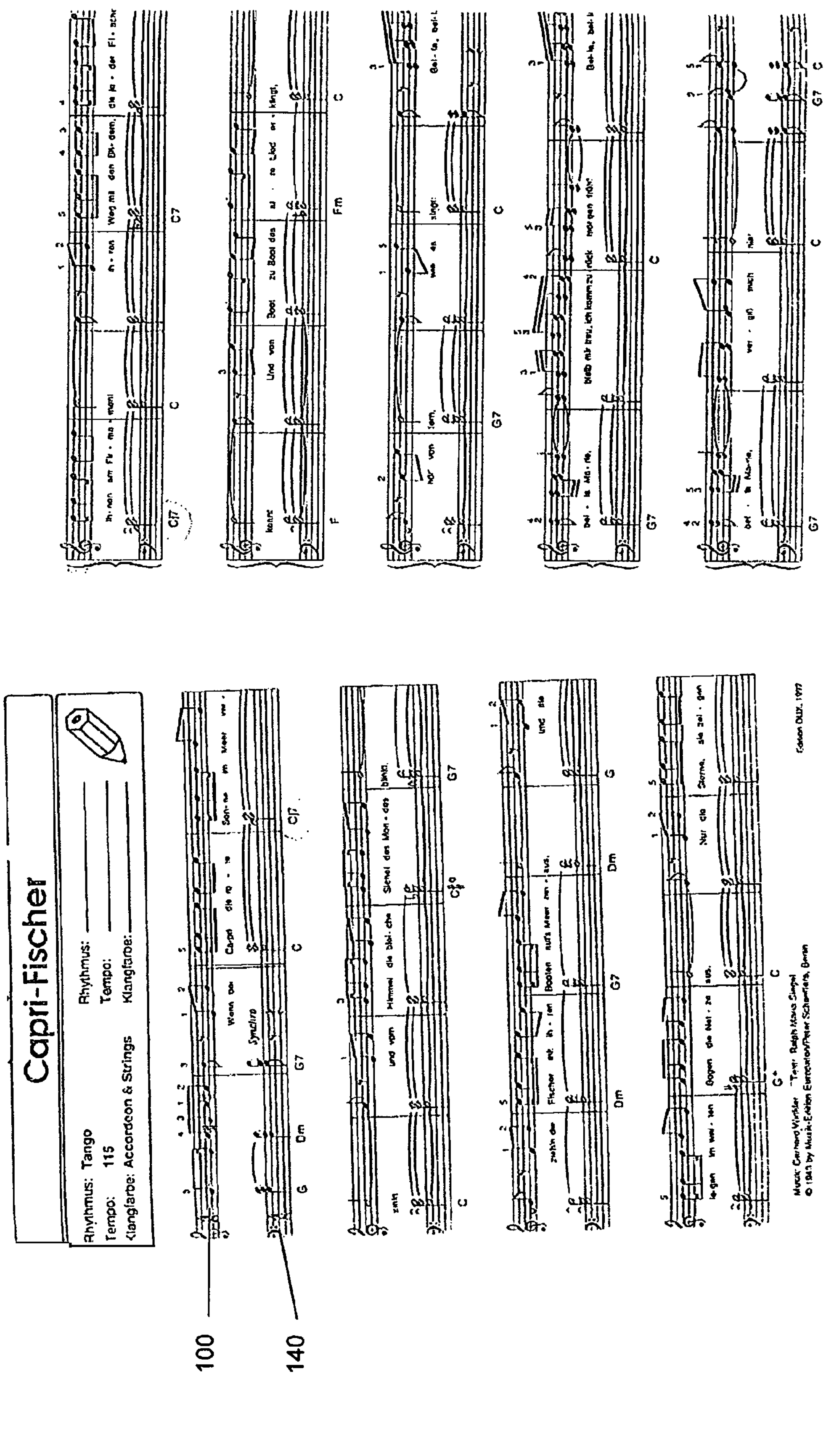
FIG. 4 shows a section of the score of a known hit song.

The score of a known hit song ("Capri-Fischer") shown in FIG. 4 comprises a melody line 100 and an accompaniment line 140. The accompaniment staff 140, which is notated in the bass note key, shows a plurality of chords, whose identification is located below the notes. For example, if the musician wishes to find the respective inverses to the chords in the accompaniment staff 140, he displaces the display element 2 vertically on the base element 4 until the upper edge of the holder 3 has reached the respective chord identification. For example, if he is looking for the inverse of the chord identified as "Dm" in the accompaniment staff 140, he first shifts the display element 2 up to the position which bears the symbol m for "major triad" 25. The dark normal position 27 and the light first, second, and third inverses 28 are now shown in the transparent display area 12. The display element 2 is horizontally displaced in this case until the first box 29 on the very left (the first note) of the basic chord 27 appears in the display area 12 below the identification "D". The notes belonging to the basic chord 27 and its inverses 28 may now be read directly horizontally on the notation 13.

In addition, the annotation of the respective notation 13 in the base key can be read in the bass staff 15.

It is obvious that the invention is not limited to the above-described embodiment. In particular, the configuration of the information (scales, staves, chords) may be configured differently. Furthermore, it can also be provided that the display window is implemented as part of the holder, and both the vertical slide and also the horizontal slide are displaceable in this holder. It is essential for the device according to the invention that the musical relationships are shown so they are understandable easily and at a glance.

The invention claimed is:

1. A device for displaying musical relationships, comprising a display element which has at least one transparent display field and is displaceable in a holder in a first direction, and is additionally displaceable via the holder along a base element in a second direction running perpendicularly to the first direction, scales, chords, and their inverses being displayed on the base element, and at least one associated chord with the associated inverses being readable in the display field for each tone of a scale, wherein at least one staff is additionally displayed on the display element, whose notes correspond to a keyboard display also situated on the display element, the display element being displaceable in a first direction along the base element until the display element has reached the desired chord identification, the notation of the desired chord having its associated inverses readable in the display field, and the display element being displaceable in a second direction which runs perpendicular to the first movement, the root of the desired chord appearing in the display field below a corresponding note identification in a notation.

2. The device according to claim 1, wherein a melody staff in the key of G is additionally displayed on the display element.

3. The device according to claim 1, wherein an accompaniment staff in the key of F is additionally shown on the display element.

4. The device according to claim 1, wherein a base staff in the key of F is additionally shown on the display element.

5. The device according to claim 1, wherein the scales shown on the base element are major scales, natural minor scales, and/or harmonic minor scales.

6. The device according to claim 1, wherein the chords shown on the base element are seventeen triads and four-note chords in the normal position.

7. The device according to claim 6, wherein the associated inverses are shown in each case for the seventeen chords on the base element.

8. The device according to claim 1, wherein a field is provided on the base element, in which chords developed by the user can be entered.

9. The device according to claim 1, wherein further elements for imparting the theory of harmony and an overview in music are displayed on the back side of the base element, the base element being insertable on both sides into the holder, so that either the front side or the back side of the base element is visible on the display field.

10. A use of a device according to claim 1 as a teaching tool for making the theory of harmony in music understandable.

* * * * *